US006752372B1

(12) United States Patent
Maisch

(10) Patent No.: US 6,752,372 B1
(45) Date of Patent: Jun. 22, 2004

(54) VALVE MAGNET

(75) Inventor: Dieter Maisch, Fellbach (DE)

(73) Assignee: IMI Norgren-Herion Fluidtronic GmbH (DE)

( * ) Notice: Subject to any disclaimer, the term of this patent is extended or adjusted under 35 U.S.C. 154(b) by 0 days.

(21) Appl. No.: 09/806,005

(22) PCT Filed: Aug. 19, 1999

(86) PCT No.: PCT/DE99/02602

§ 371 (c)(1), (2), (4) Date: Mar. 23, 2001

(87) PCT Pub. No.: WO00/17895

PCT Pub. Date: Mar. 30, 2000

(30) Foreign Application Priority Data

Sep. 23, 1998 (DE) ........................................ 198 43 519

(51) Int. Cl.$^{7}$ ................................................ F16K 31/02

(52) U.S. Cl. ............................ 251/129.01; 251/129.15; 335/256

(58) Field of Search ............................... 336/83 R, 192, 336/198; 335/220–229, 256, 276–8; 251/129.01–129.2; 123/568.21

(56) References Cited

U.S. PATENT DOCUMENTS

| | | | | |
|---|---|---|---|---|
| 4,412,196 | A | 10/1983 | Teichert | |
| 6,374,814 | B1 * | 4/2002 | Cook et al. | 335/219 |
| 6,392,520 | B1 * | 5/2002 | Hofmann et al. | 336/107 |

FOREIGN PATENT DOCUMENTS

| | | |
|---|---|---|
| DE | 29 26 549 | 1/1981 |
| DE | 298 672 | 10/1993 |

* cited by examiner

*Primary Examiner*—Lincoln Donovan
(74) *Attorney, Agent, or Firm*—Ostrolenk, Faber, Gerb & Soffen, LLP

(57) ABSTRACT

A valve solenoid including a housing having two parts and which can be employed in areas endangered by explosion, a coil, an iron circuit, the coil and the iron circuit being arranged in the housing, and a casting compound introduced into a first part of the housing so as to embed the coil and the iron circuit whereby the casting compound prevents an explosive atmosphere from reaching live parts and simultaneously fixes the coil and iron circuitry and provides electrical insulation. The coil has connecting elements arranged in the second housing part which is configured to resist pressure in case of an internal explosion and prevents transmission of the explosion to the environment thereby providing pressure-resistant encapsulation.

1 Claim, 1 Drawing Sheet

VALVE MAGNET

This is a U.S. national stage of application No. PCT/DE99/02602, filed on Aug. 19, 1999. Priority is claimed on that application and on the following application:

Country: Germany, Application No.: 198 43 519.3, Filed: Sep. 23, 1998.

BACKGROUND OF THE INVENTION

The invention relates to a valve solenoid comprising a coil and a an iron circuit, which are arranged in a housing which can be employed in areas endangered by explosion.

Such valve solenoids have long been known and are evident, for example, from the German utility model 90 03 343 or from the U.S. Pat. No. 5,138,292.

Widely varying types of ignition protection are known. Types of ignition protection in accordance with IEC or EN (EN 50014 ff.) are: "pressure-resistant encapsulation (EExd)", "enhanced safety (EExe)", "over-pressure encapsulation (EExp)", "intrinsic (EExi)", "oil immersion (EExo) ", "sand filling (EExq)" and "cast encapsulation (EExm)".

Designs for explosionproof solenoids are also known in which it is not only the "pure" ignition protection types mentioned above which are used but also combinations of these ignition protection types, such as the ignition protection types "cast encapsulation" combined with "enhanced safety" or "pressure-resistant encapsulation" combined with "increased safety" .

SUMMARY OF THE INVENTION

The object of the invention is to provide an explosion-proof valve solenoid that can easily be manufactured at low cost while satisfying the ignition protection type "pressure-resistant encapsulation" in the region where external cables are connected.

This object is achieved according to the invention, in a valve solenoid of the type described above, in that the coil and the iron circuit are embedded in a casting compound introduced into a housing part, which casting compound prevents an explosive atmosphere reaching live parts and is simultaneously used for fixing purposes and electrical insulation (cast encapsulation). Connecting elements of the coil are arranged in a housing part which withstands internal pressure in the case of an explosion and prevents transmission of the explosion to the environment (pressure-resistant encapsulation).

The major advantage of dividing the housing into two housing parts, one of which satisfies the "cast encapsulation" ignition protection type and the other the "pressure-resistant encapsulation" ignition protection type is that the coil and the iron circuit, in particular the solenoid enclosure sleeve, are not part of the pressure-resistant area. This housing part does not therefore require complicated fitting procedures, which are necessary in the case of pressure-resistant encapsulations because of the fact that the gaps must not allow ignition penetration. The physical size of the solenoid can, in addition, be reduced by the avoidance of such gaps, which must have a specified minimum length.

In addition to its ease of manufacture, such valve solenoids also have the advantage that cast encapsulated coils and iron circuits or solenoid enclosure sleeves are available as standard parts with the result that stockholdings are reduced. Nevertheless, the external cables can be connected in a pressure-resistant, encapsulated area arranged in the second housing part.

Further advantages and features of the invention are the subject matter of the following description and of the drawing representation of an embodiment of the invention.

DETAILED DESCRIPTION OF THE PREFERRED EMBODIMENTS

Figure 1:
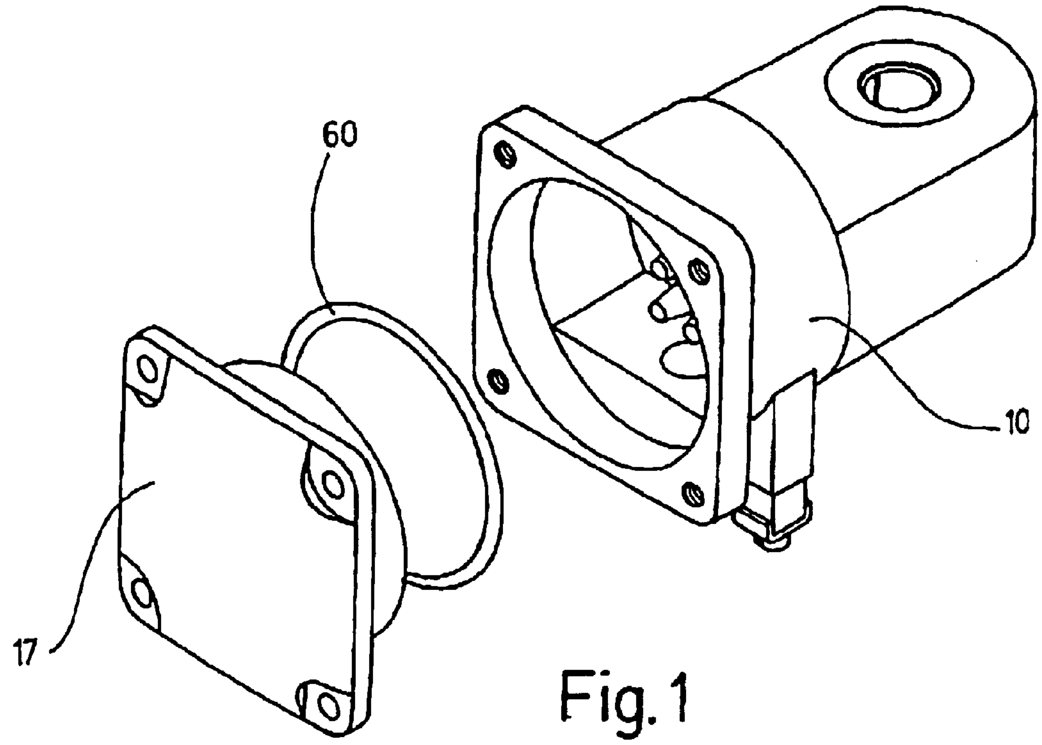
FIG. 1 shows a valve solenoid according to the invention in an exploded view and FIG. 2 shows a sectional view of the valve solenoid, according to the invention, shown in FIG. 1.
Figure 2:
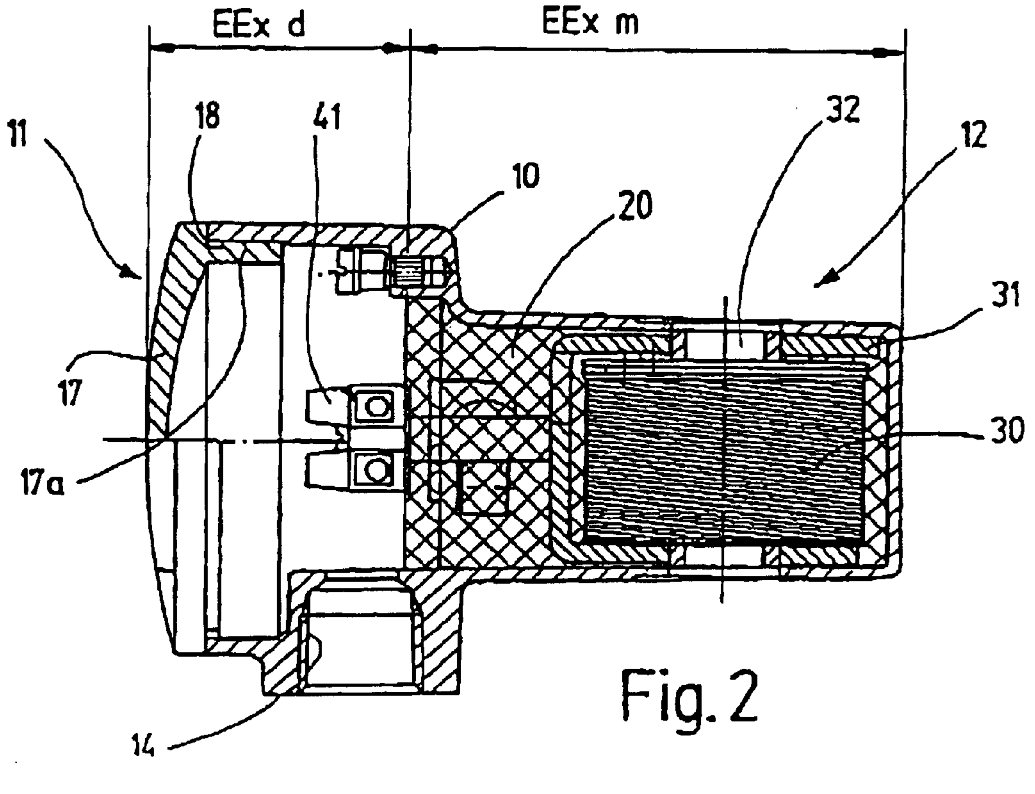

A valve solenoid, which is shown in FIG. 1 and FIG. 2, comprises a housing 10, which is subdivided into two housing parts 11, 12.

A coil 30 and a an iron circuit 31 are embedded in a casting compound 20 in the housing part 12, which satisfies the "cast encapsulation, EExm" ignition protection type. The coil has a through-opening 32 for holding an armature, by means of which a valve can be actuated, in a manner known per se, in an environment endangered by explosion. Electrical connecting elements 41, which protrude beyond the casting compound 20 which seals the housing part 12 at its end, are also embedded in the casting compound 20. The casting compound 20 is used to exclude an explosive atmosphere as well as for fixing purposes and electrical insulation.

These connecting elements 41 for the connection of electrical cables for activating the coil 30 are arranged in the other housing part 11, which satisfies the "pressure-resistant encapsulation" ignition protection type. External cables are introduced by means of an opening 14 into the interior area of the pressure-resistant encapsulated housing part 11.

The housing part 11 is closed at its end by a cap 17. This engages, by means of a protrusion 17*a* on it, in an end-face opening 18 in the housing in such a way that a predetermined length of the protrusion 17*a* overlaps the opening 18, which is complementary to the protrusion 17*a*, so as to form a gap between the protrusion 17*a* and the opening 18 which is secure against ignition penetration. In addition, a seal 60 can be provided which, in the assembled state, is arranged between the cap 17 and the housing 10.

The housing part 11 is configured in such a way that it resists a pressure, which is standardized, in the case of an explosion of an explosive mixture within it and transmission of the explosion to the vicinity of the housing 10 is prevented.

The advantage of the valve solenoid described above is that the cast encapsulation of the housing part 12, and therefore an explosion-protected valve solenoid which satisfies the combined ignition protection type EExmd (cast encapsulation and pressure-resistant encapsulation), can be manufactured in a simple manner and therefore at low cost.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A valve solenoid comprising: a housing having a first part and a second part and which can be employed in areas endangered by explosion; a coil; an iron circuit, the coil and the iron circuit being arranged in the housing; a casting compound introduced into the first part of the housing so as to embed the coil and the iron circuit so that the casting compound prevents an explosive atmosphere from reaching live parts and simultaneously fixes the coil and iron circuitry and provides electrical insulation, the coil having connecting elements arranged internally in the second housing part which is configured to resist explosion pressure in case of an internal explosion and prevents transmission of the explosion to the environment thereby providing explosion pressure-resistant encapsulation of the connecting elements; and a cap arranged on an end of the second housing part so as to close the housing, the cap having a protrusion that engages in a complimentary end face opening in the housing so that a predetermined length of the protrusion extends into and overlaps the opening so as to form a gap between the protrusion and a surface of the opening which is secure against ignition penetration.

* * * * *